(12) United States Patent
Leymann et al.

(10) Patent No.: US 7,055,063 B2
(45) Date of Patent: May 30, 2006

(54) METHOD AND SYSTEM FOR ADVANCED RESTART OF APPLICATION SERVERS PROCESSING TIME-CRITICAL REQUESTS

(75) Inventors: Frank Leymann, Aidlingin (DE); Dieter Roller, Schoenaich (DE)

(73) Assignee: International Business Machines Corporation, Armonk, NY (US)

( * ) Notice: Subject to any disclaimer, the term of this patent is extended or adjusted under 35 U.S.C. 154(b) by 734 days.

(21) Appl. No.: 09/683,015

(22) Filed: Nov. 8, 2001

(65) Prior Publication Data
US 2002/0059306 A1 May 16, 2002

(51) Int. Cl.
*G06F 11/08* (2006.01)
(52) U.S. Cl. .............................. 714/16; 714/6; 714/15; 707/202
(58) Field of Classification Search .................... 714/6, 714/15, 16; 707/202
See application file for complete search history.

(56) References Cited

U.S. PATENT DOCUMENTS

| 5,043,866 | A | * | 8/1991 | Myre et al. .................... 714/16 |
| 5,721,918 | A | * | 2/1998 | Nilsson et al. .............. 707/202 |
| 5,850,522 | A | * | 12/1998 | Wlaschin .................... 709/215 |
| 6,161,219 | A | * | 12/2000 | Ramkumar et al. ......... 717/130 |
| 6,351,754 | B1 | * | 2/2002 | Bridge et al. ................. 714/16 |

* cited by examiner

Primary Examiner—Robert W. Beausoliel, Jr.
Assistant Examiner—Joseph D Manoskey
(74) Attorney, Agent, or Firm—Michael J. LeStrange

(57) ABSTRACT

A method and apparatus for implementing a recovery process for a resource manager. The method and apparatus has the resource manager take checkpoints in a manner such that in the case of failure of the resource manager, the time it takes to have requests processed again is shorter than a specified request processing time.

9 Claims, 5 Drawing Sheets

PRIOR ART

METHOD AND SYSTEM FOR ADVANCED RESTART OF APPLICATION SERVERS PROCESSING TIME-CRITICAL REQUESTS

BACKGROUND OF THE INVENTION

1. Field of the Invention

The invention relates to a data processing environment consisting of one or more application servers processing requests, particularly time-critical requests, on behalf of at least one application and, more specifically, to a method and a system for controlling restart processing after termination of one or more resource managers that are involved in managing resources needed by an application server to fulfill application requests.

2. Background of the Invention

A typical data processing environment consisting of an application server for processing time-critical transactions is shown in FIG. 1. An application server implements a collection of related services which are requested from applications via application clients. Applications, application servers, and application clients may be implemented by computer programs of any nature not limited to a specific type of implementation. Application, application server, and application client are only logical structures; for example, an application server could be the application that requests services from another application server or even requests services from itself.

Application servers typically run on the second tier of a three-tier system structure. In such a three-tier system structure the application client is on the first tier, requesting services from an application server on the second tier, which in turn requests services from back-end applications that are located on the third tier. The three-tier system structure is a conceptual structure. That means, even if it is typical to deploy the different tiers onto different computers, there is no need to do so; the deployment of the complete structure onto a single computer is a completely valid approach. It should be noted that a three-tier structure is just a special case of an n-tier structure. For example, if users are interacting via a Web browser, then the Web browser would be considered running on tier 0 and the associated web server which runs the application requesting services from the application server is considered running on tier 1.

Application servers are typically stateless, that is, they store any necessary state information into a persistent data storage. State information is data that the application server maintains between two subsequent requests from a client so that the individual requests from the application requesting services can be correlated.

Application servers, in general, run the processing of requests as transactions in the sense of ACID transactions which means all requests are either processed completely or not at all. A thorough representation of transaction technology is given by Jim Gray and Andreas Reuter, "Transaction Processing: Concepts and Techniques", Morgan Kaufmann Publishers, Inc., 1993. In the case of an error, the transaction is aborted, all resources are reset to the state they have been before the transaction was started. For example, if the access to the relational database that maintains the application server state fails, all changes made to any of the involved resources are backed out, i.e. the message in a message queue that represents the request is put back into the queue from where it was read. This requires that all resources that are used by the application server for persistent data are managed by resource managers that can participate in transactions.

If any one of the involved software components fails, all components must be brought back to the state when the failure of the one or more components occurred so that processing can continue. The process of bringing a failed component back is called a restart process. The time it takes to restart a component depends on how much work needs to be undone and redone to re-establish the state of the component at the time of failure.

Resource managers maintain a log that contains entries about all changes that were applied to their managed resource. The log is typically maintained on highly available disks that, for example, exploit RAID technology. In addition, the resource managers periodically take snapshots of their current state and write this information as a checkpoint into the log. This information is used for recovery from resource manager failures, such as the abnormal termination of the resource manager or the loss of the media on which the resource manager maintains the resource. Recovering from an abnormal termination of the resource manager is called crash recovery, while recovering from a media failure is called media recovery. It should be noted that media recovery is no longer considered an issue in resource manager recovery due to the high availability of the disks on which the data is maintained and is therefor not considered in the present invention. The component of resource managers that is responsible for recovering from failures is typically called the restart manager. When the resource manager is restarted after the crash, the restart manager uses the checkpoint information and the individual log entries to reconstruct the latest state; that means the restart component needs to figure out which transactions need to be aborted, such as those executing when the crash occurred, and which committed updates need to be redone. This is done by locating the checkpoint record and processing all log records that are coming after the checkpoint record. Thus, the frequency with which checkpoint records are taken, determines the amount of processing that is required to restart the failing component after a failure.

In the prior art approaches, different resource managers have different policies when to write a checkpoint record. These policies are typically specified via some global settings, such as the number of processed messages in a message queuing system or the time period between two subsequent checkpoints in a relational database management system. These settings may be fixed so that they can not be changed by the user, as for example in a message queuing system MQSeries where the number of processed messages is set to 1000; or these settings may be variable, as for example in a relational database management system DB2, where the time between checkpoints can be set by the user.

A resource manager typically serves multiple applications such as multiple different application servers. In this case, the log is used for all changes caused by all applications. However, some resource managers, such as DB2, allow multiple instances to run. An instance consists of all the information needed to support users; it has its own catalog for managing metadata, own log, and appropriate user data. A particular application server can be associated with a particular instance. In this case, the log is only used for the operations of the particular application server.

The checkpoint record frequency settings for each of the involved resource managers determines how long it will take to recover from the crash of one or more of the resource managers. As each participating resource manager takes checkpoints independently, the maximum restart time of the application server can be calculated as the restart time of the resource manager with the longest restart time plus the restart time of the application server itself.

Typically, the restart time is obtained by running simulations with the application server. Since simulation never matches real-life situations, the estimated restart time is only an approximate value.

Taking checkpoints is not only a time-consuming operation, it also slows down processing of requests as the resource manager must dedicate processing and I/O resources for taking the checkpoint. Since there is no correlation between the processing of the application server and the frequency of checkpoint taking by the involved resource managers, checkpoints may be taken, even if not required.

BRIEF SUMMARY OF THE INVENTION

It is therefore an aspect of the present invention to provide a method and a system which guarantee that in the case of a failure of the environment, such as a crash of one or more of the resource managers, the request processing time of the application server does not exceed a pre-specified, in particular a user-defined, request processing time.

It is another aspect of the present invention to provide such a method and a system which enable an application server that processes time-critical requests to guarantee that a user-specified request processing time is not exceeded, even if any of the resource managers needed to satisfy the requests terminates abnormally.

It is yet another aspect of the present invention to provide such a method and a system which minimize the number of checkpoints being taken by the resource managers involved in running the application server transactions.

The prior art problems are solved by the method according to the invention by having the resource managers taking checkpoints in a frequency that guarantees that the restart of the application server, including the restart of the resource managers and including the processing time of the request, does not exceed the specified request processing time. Even in the case of failure of any of the involved resource managers, it is achieved that the time it takes to have the requests processed again is shorter than a specified request processing time. Thus the proposed mechanism ensures that the resource managers take checkpoints in such a frequency that the time it takes to have the application server processing requests again is shorter than the specified request processing time.

The concept underlying the invention is based on the observation that the frequency with which checkpoint records are taken determines the amount of processing that is required to restart a failing component after a failure.

The method according to the invention preferably specifies two mechanisms of controlling when a checkpoint needs to be written, one being a load-controlled mechanism and the other being a restart-time-controlled mechanism.

In both cases, specification of the request processing time may either be hard coded in the application server or provided to the application server as a parameter. As an additional option, the application server may support changing of the request processing time during operation, for example, by offering an appropriate application programming interface, or some graphical/textual interface.

In the load-controlled method, the application server knows the amount of data that each resource manager writes into its log and the amount of time it takes the resource manager to process the log in the case of a restart. Thus, the application server knows at any time the currently necessary restart time of each resource manager and, based on that information, requests the taking of checkpoints from the resource managers so that the specified request processing time could even be met in the case of a failure of one or more resource managers. The load-controlled method is based on the assumption that the resource managers provide the capability for calling applications to request the taking of checkpoints.

In the restart-time-controlled method, the resource manager provides the capability for the specification of a restart time. This allows the application server to determine from the user specified request processing time the appropriate restart time for each of the involved resource managers. This information is handed over to the resource manager when the application server connects to the resource manager the first time or when the user specified request processing time is changed.

Thereupon, a further advantage of the proposed mechanism is that checkpoints have only to be taken if necessary, resulting in an improved throughput of the application server.

BRIEF DESCRIPTION OF THE SEVERAL VIEWS OF THE DRAWINGS

The invention will now be described in the following in more detail by way of embodiments whereby reference is made to the accompanying drawings. In the drawings.

DETAILED DESCRIPTION OF THE INVENTION

Description of the Preferred Embodiments

Figure 1:
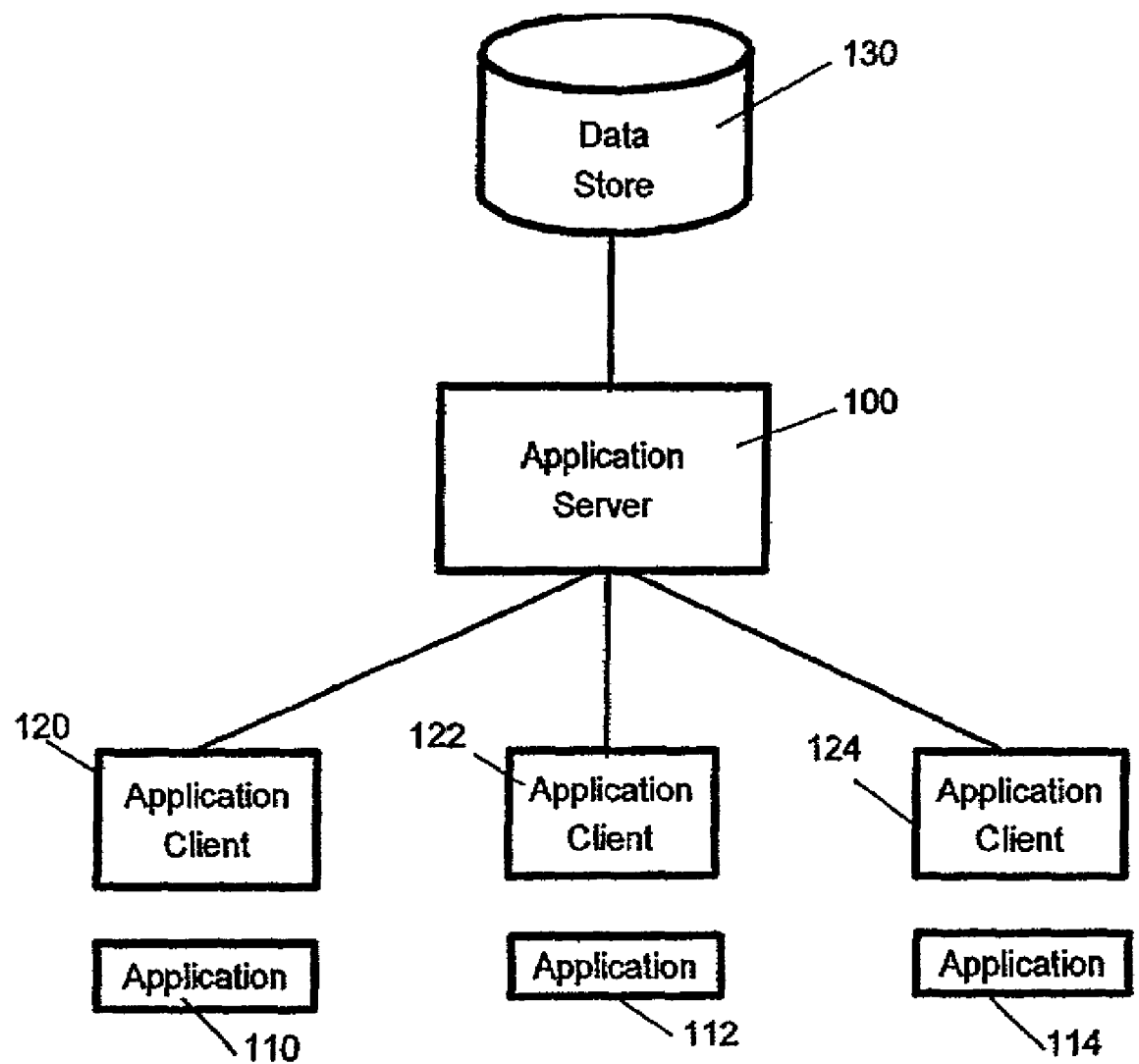
FIG. 1 is a schematic block diagram depicting an application server according to the prior art where the present invention can be applied.

FIG. 1 shows the typical structure of an application server. A number of applications request services from the application server via application clients. Application server 100 implements a collection of services which are requested from applications 110, 112, and 114 via application clients 120, 122, and 124. Applications 110, 112, and 114, application server 100, and application clients 120, 122, and 124 may be implemented by computer programs of any nature not limited to any specific type or implementation. Applications 110, 112, and 114, application server 100, and application clients 120, 122, and 124 are only logical structures. For example, application server 100 can be application 110 itself that requests services from another application server (not shown here) or even requests services from itself. As application server 100 is stateless, all information that is needed between subsequent requests from applications 110, 112, and 114 are kept in data store 130.

Figure 2:
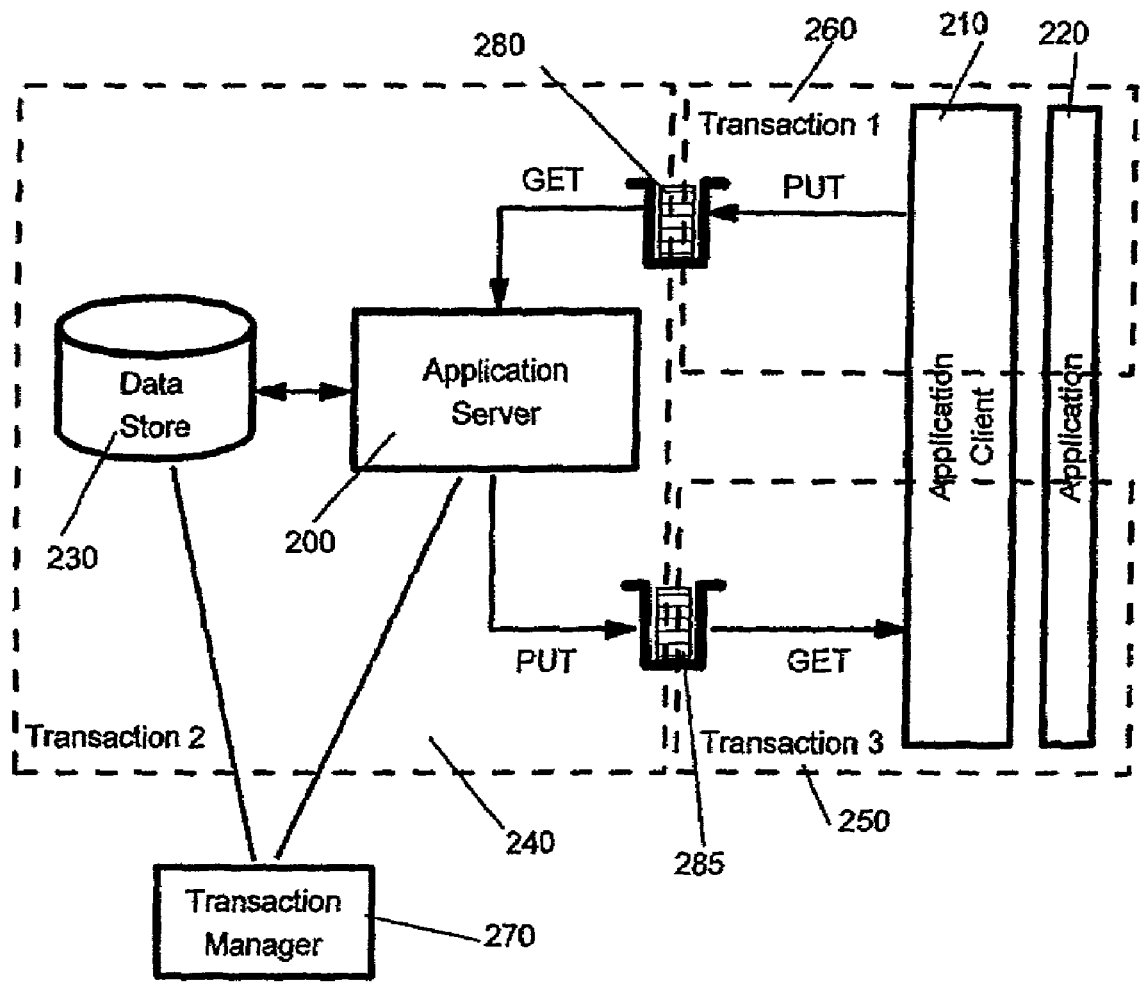
FIG. 2 is a schematic block diagram depicting the internal structure and transaction boundaries of a message-based application server where the present invention can be applied.

FIG. 2 consists of a particular implementation of an application server, namely message-based application server 200, which means the communication between application client 210 and application server 200 is based on asynchronous reliable message exchange. But it is understood hereby that the invention is not limited to a certain communication paradigm. FIG. 2 is used to illustrate how an application server processes requests as transactions; the transaction boundaries are indicated by dashed lines.

When application 220 requests a service from application server 200, application client 210 puts a message reflecting the request of application 220 into application server input queue 280. This is done as transaction 260, labeled Transaction 1, so that when the request has been successfully put into application server input queue 280, the request of application 220 will be honored.

Application server 200 processes requests within transaction 240, labeled Transaction 2. The transaction consists of reading the request from input queue 280, performing processing based on the request, saving processing state information persistent into data store 230, and putting a response into application server output queue 285.

Application 220 gets this response by application client 210 reading the response from application server output queue 285. This process is run as transaction 250, labeled transaction 3.

In the processing of a request and generating a response by application server 200, multiple resources are accessed and possibly modified. Since multiple resources and thus multiple resource managers are involved in such a transaction, the transaction must be coordinated via transaction manager 270 typically using a two-phase-commit (2PC) protocol. The individual resources are typically managed by different resource managers. For example, the application server's input and output queue 280, 285 are managed by a message queuing system (not shown) and data store 230 by a relational database management system (not shown). The involvement of multiple resource managers mandates a transaction manager which coordinates the processing of the individual resource managers when the transaction needs to be committed or aborted. The 2PC protocol is the protocol that transaction managers typically exploit to coordinate commit/abort processing with the resource managers involved in a particular transaction. Further information can be found in the textbook "Transaction Processing: Concepts and Techniques", authored by Jim Gray and Andreas Reuter and published by Morgan Kaufmann Publishers, Inc., 1993 which is regarded to be entirely incorporated herein by reference.

Referring again to FIG. 2, application server 200 processes each individual client request as a transaction. The term transaction should not be understood as limited to the classical definition of transactions, that means having ACID properties, but to all units of work concepts that provide some form of transaction control by weakening one or more of the ACID properties.

It is further noted that, although the above description is related to an application server, the scope of the present invention is by no means limited to such an application server and, moreover, can be used for any other application which performs the described interaction patterns with resource managers.

Figure 3:
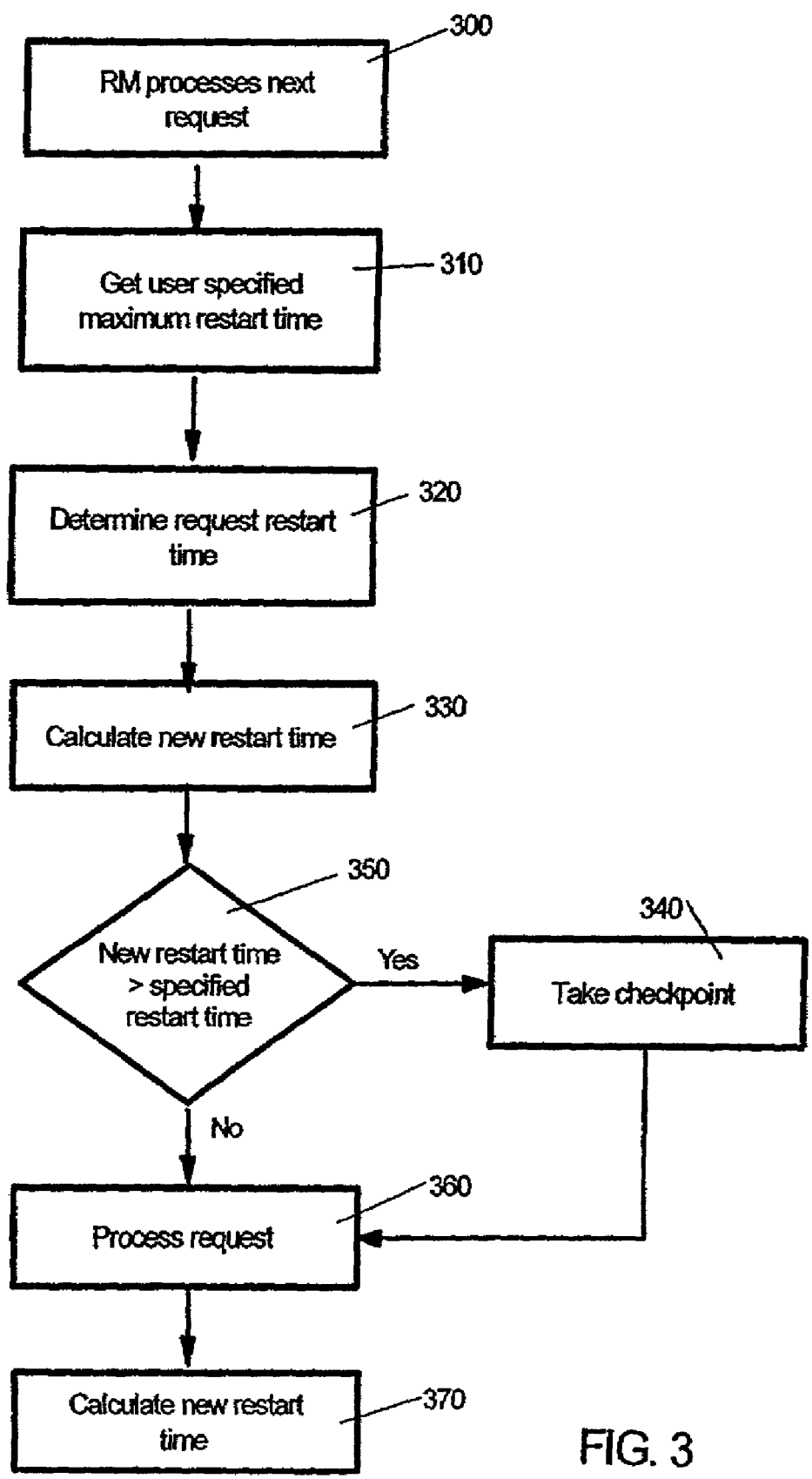
FIG. 3 is a flow diagram illustrating the user controlled resource manager checkpoint controlling mechanism according to the present invention.

FIG. 3 shows the processing of a request by the resource manager (RM) when the resource manager supports user-specified checkpoint processing based on the present invention. It assumes that one or a multitude of users has specified a maximum restart time, hereafter referred to as restart time, for the resource manager and the resource manager has stored this information internally. It is noted that the user or multitude of users, alternatively, can specify two or more restart times wherein the proposed mechanism takes the minimum restart time for generating checkpoints. When the resource manager processes next request 300, it first determines the current settings for user specified restart time 310. This restart time must not be exceeded in case of failure. Next, the resource manager determines the restart time needed for current request 320 and the potential previous requests, which would participate in restart processing since the last checkpoint processing, and then calculates new restart time 330. If the new restart time would exceed the specified restart time effect of the request on overall restart time 350, a checkpoint is taken 340. Then the request is processed 360 and the new restart time is calculated 370. It should be noted, that FIG. 3 is for illustration purpose only; actual implementations are most likely more sophisticated.

In the following, two different embodiments of the invention are described in more detail.

Load-Controlled Checkpointing

It is hereby assumed that resource managers provide the capability for applications to request checkpoints. How the resource managers externalize this capability is not relevant, whether it is the sending of a message to queue or the invocation of the request via an application programming interface.

Figure 4:
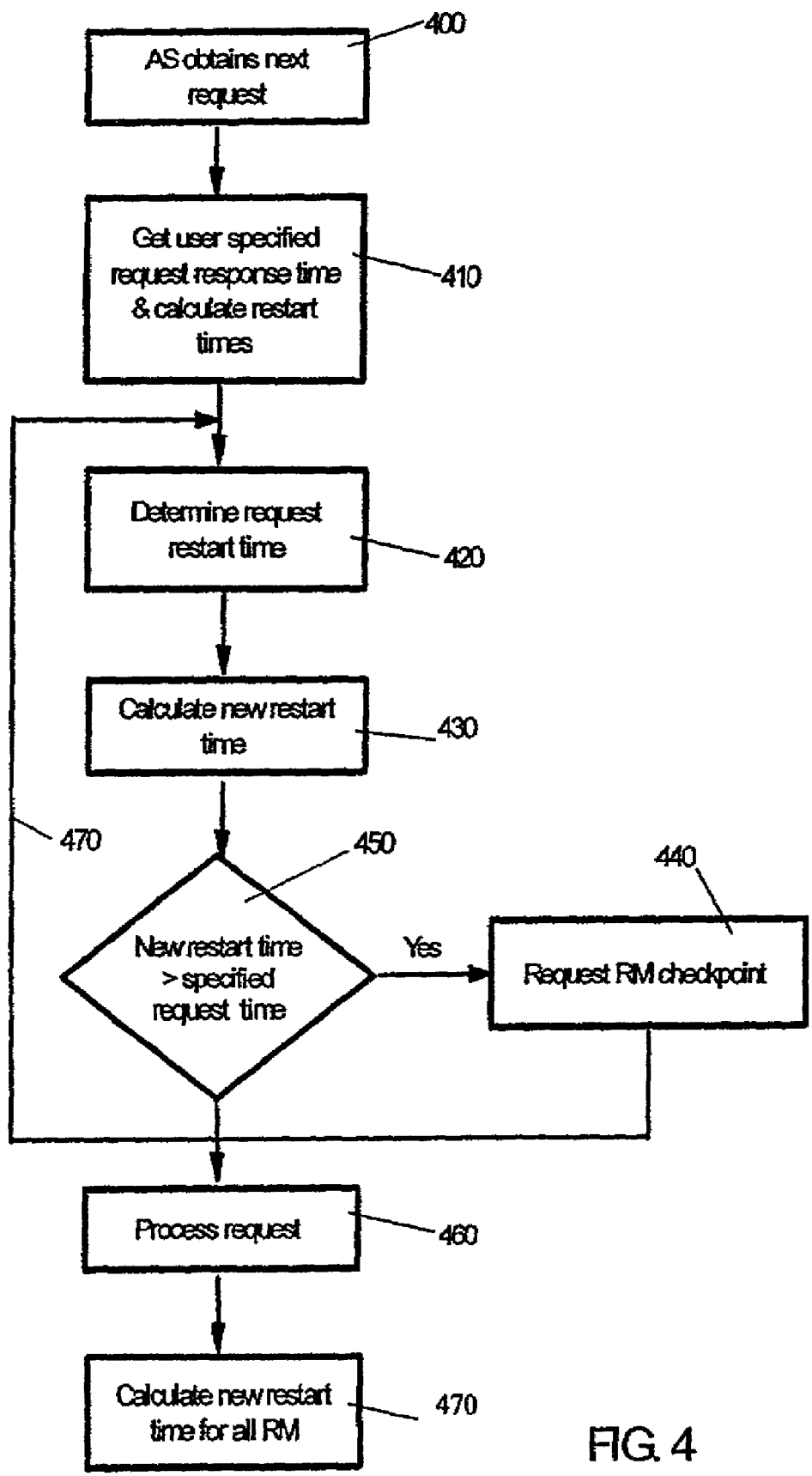
FIG. 4 is a flow diagram illustrating detailed method steps of the load-controlled checkpoint mechanism according to the present invention.

FIG. 4 shows the processing of a request by the application server (AS) using load-controlled checkpointing according to the present invention. It is assumed that the application server has knowledge about the amount of log data written by each resource manager and the amount of time it takes to process the log during recovery. It further assumes that the user has specified the maximum request response time (not the restart time), hereafter referred to as response time, for the application server, and the application server has stored this information internally.

When the application server processes next request 400, it first determines the current settings for user specified request response time 410. This request response time must not be exceeded in case of failure. Next, the application server performs a set of actions (indicated by loop 470) for all resource managers. First, the application server determines the restart time needed for current request 420 and the potential previous requests, which would participate in restart processing since the last checkpoint processing, and then calculates new restart time 430. If the new restart time would exceed the restart time necessary to keep within requested response time 450, the resource manager is requested to take checkpoint 440. The mapping of the request response time to the restart time takes into effect additional processing that is associated with the restart after a failure, such as starting the application server or reattaching to the failing resource manager. After all resource managers have been processed, the request is processed 460 and the new restart time is calculated for all resource managers 470. It should be noted, that FIG. 4 is for illustration purpose only; actual implementations are most likely more sophisticated.

If the resource manager does not support the notion of a resource manager instance, then the resource manager must provide the capability to assign a separate log to a particular application. In addition, the resource manager must provide the capability that applications can request that checkpoints are taken only for a particular log. When a crash occurs, then the resource manager must process this log before any other log, unless there is no time penalty when processing multiple logs in parallel.

To summarize, in the load-controlled checkpointing approach the above teaching is embodied within an application server which controls the checkpointing frequency based upon guaranteed response time requirements on behalf of the underlying resource managers. In addition, this approach reflects the processing required to restart the application server itself.

Restart Time Controlled Checkpointing

The load-controlled checkpoint approach requires that the application server has a deep understanding of the logging and restart operations of each of the involved resource managers. In particular, the metrics associated with logging and restart need to be changed whenever the resource manager is changed.

In order to increase performance and throughput of the application server(s), in the present embodiment, the resource managers themselves keep track of the restart time instead of the application server. The resource manager externalizes the capability for applications to set the restart time and the resource manager then takes a checkpoint whenever the specified restart time is reached. FIG. 3 shows how a resource manager could implement this capability.

Figure 5:
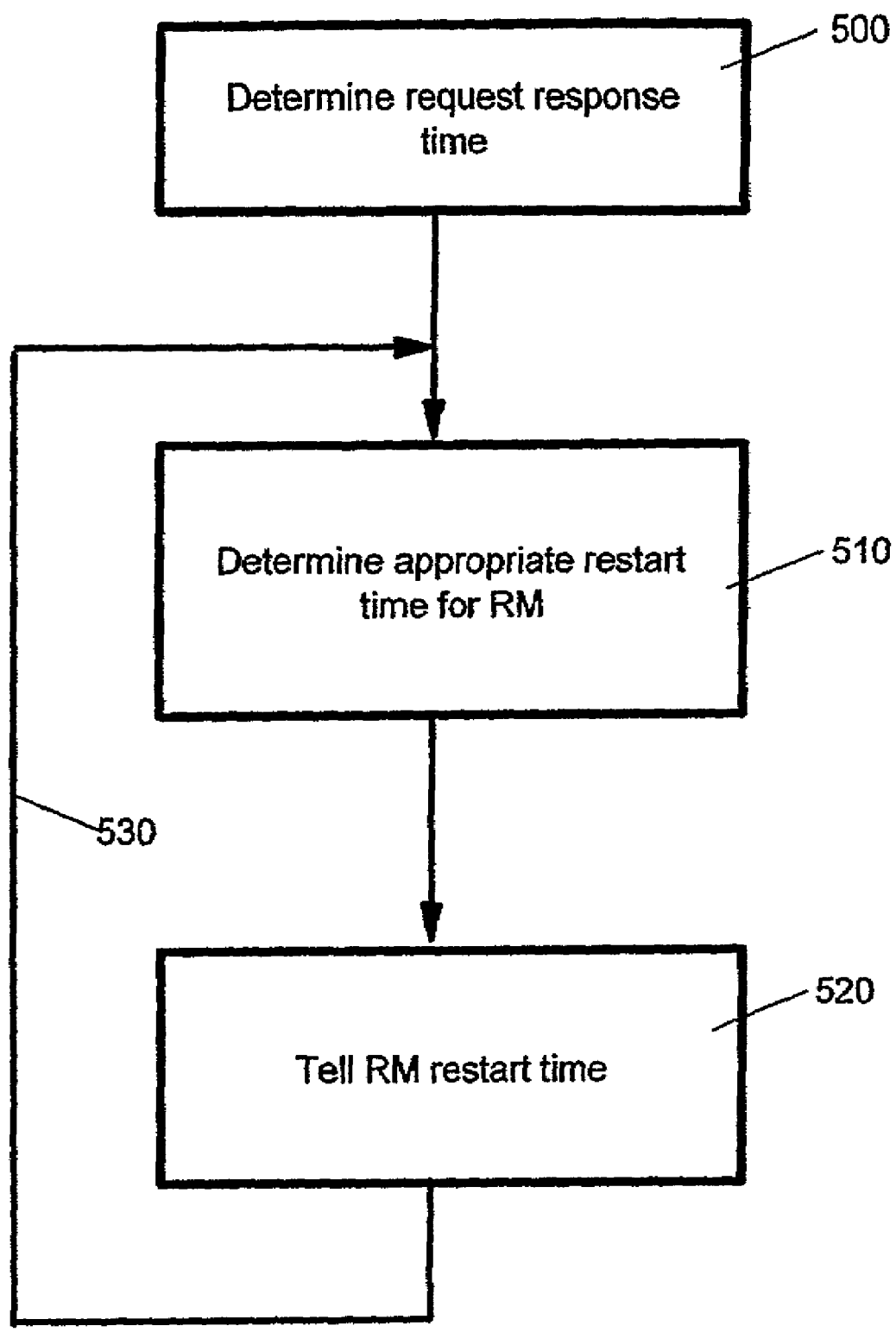
FIG. 5 shows exemplary actions performed by an application server where a resource manager supports a user-defined restart time.

FIG. 5 shows the actions that the application server needs to take when the resource manager (RM) supports a user-defined restart time. In step 500, the application server obtains user specified maximum request response time, hereafter referred to as request response time. The application server then performs a set of actions (indicated by a loop) for all resource managers. Step 510 calculates the appropriate restart time for the resource manager from the specified request response time. Transformation of the request response time to the restart time of the resource manager is necessary to cope with additional processing needs, such as the start up of the application server itself. In step 520, the application server hands over this restart time to the resource manager. The resource manager itself would then execute the code shown in FIG. 3 if called by the application server. It should be noted, that FIG. 5 is for illustration purpose only; actual implementations are most likely more sophisticated.

Although specific embodiments of the present invention have been illustrated in the accompanying drawings and described in the foregoing detailed description, it will be understood that the invention is not limited to the particular embodiments described herein, but is capable of numerous rearrangements, modifications and substitutions without departing from the scope of the invention. The following claims are intended to encompass all such modifications.

What is claimed is:

1. A method of dynamically controlling restart processing for recovery of an application having an application server, said method comprising the steps of:
    receiving a new request to modify a resource;
    receiving, with the server, a maximum request response time defining a time not to be exceeded for application requests even in case of termination or recovery of a resource manager;
    dynamically calculating, with the application server, a current maximum restart time by subtracting from said maximum request response time processing time of further activities associated with said restart processing; and
    dynamically initiating said resource manager to take a checkpoint whenever said restart time exceeds the current maximum restart time.

2. The method of claim 1, wherein said further activities comprise processing time required to restart said application server.

3. The method of claim 1, wherein said further activities comprise processing time required for re-attaching said application server to said resource manager.

4. A method of dynamically controlling restart processing for recovery of an application such as an application server, said method comprising the steps of:
    receiving from an application client a maximum request response time defining a time not to be exceeded for application requests even in case of termination or recover of a resource manager;
    dynamically calculating a restart time required to restart a resource manager in case of termination or recovery of said resource manager including the time required for processing further activities associated with the restart process; and
    dynamically initiating said resource manager to take a checkpoint whenever said restart time exceeds the maximum request response time.

5. The method of claim 4, wherein said further activities comprise processing time required to restart said application server.

6. The method of claim 4, wherein said further activities comprise processing time required for re-attaching said application server to said resource manager.

7. A computer program product comprising a computer useable medium including a computer readable program for dynamically controlling the restart processing for recovery of an application such as an application server, wherein the computer readable program when executed on a computer causes the computer to:
    receive from an application client a maximum request response time defining a time not to be exceeded for application requests even in case of termination or recover of a resource manager;
    dynamically calculate a restart time required to restart a resource manager in case of termination or recovery of said resource manager including the time required for processing further activities associated with the restart process; and
    dynamically initiating said resource manager to take a checkpoint whenever said restart time exceeds the maximum request response time.

8. The computer program product of claim 7, wherein further activities includes the processing time required to restart said application server.

9. The computer program product of claim 7, wherein said further activities comprise processing time required for re-attaching said application server to said resource manager.

* * * * *

UNITED STATES PATENT AND TRADEMARK OFFICE
CERTIFICATE OF CORRECTION

PATENT NO. : 7,055,063 B2
APPLICATION NO. : 09/683015
DATED : May 30, 2006
INVENTOR(S) : Leymann et al.

It is certified that error appears in the above-identified patent and that said Letters Patent is hereby corrected as shown below:

On Title Page, after (65) Prior Publication Date and before (51) Int. Cl., insert the following text:

(30) Foreign Application Priority Data
     November 14, 2000    (EP) …………..00124796.4

Signed and Sealed this

Sixteenth Day of January, 2007

JON W. DUDAS
*Director of the United States Patent and Trademark Office*